United States Patent
Pistoia et al.

(10) Patent No.: US 10,740,071 B2
(45) Date of Patent: *Aug. 11, 2020

(54) PREDICTING AND USING UTILITY OF SCRIPT EXECUTION IN FUNCTIONAL WEB CRAWLING AND OTHER CRAWLING

(71) Applicant: International Business Machines Corporation, Armonk, NY (US)

(72) Inventors: Marco Pistoia, Amawalk, NY (US); Omer Tripp, Amawalk, NY (US); Shahar Sperling, Tel-Mond (IL)

(73) Assignee: International Business Machines Corporation, Armonk, NY (US)

(*) Notice: Subject to any disclaimer, the term of this patent is extended or adjusted under 35 U.S.C. 154(b) by 573 days.

This patent is subject to a terminal disclaimer.

(21) Appl. No.: 14/742,964

(22) Filed: Jun. 18, 2015

(65) Prior Publication Data

US 2016/0210125 A1 Jul. 21, 2016

Related U.S. Application Data

(63) Continuation of application No. 14/597,749, filed on Jan. 15, 2015.

(51) Int. Cl.
  *G06F 16/958* (2019.01)
  *G06F 9/455* (2018.01)
  *G06F 8/30* (2018.01)

(52) U.S. Cl.
  CPC ............ *G06F 8/31* (2013.01); *G06F 9/45529* (2013.01); *G06F 16/986* (2019.01)

(58) Field of Classification Search
  None
  See application file for complete search history.

(56) References Cited

U.S. PATENT DOCUMENTS 6,285,999 B1    9/2001  Page
6,774,917 B1 *  8/2004  Foote ................. G06K 9/00758
                                                        715/700

(Continued)

FOREIGN PATENT DOCUMENTS

WO    2006108069 A2    10/2006

OTHER PUBLICATIONS

Zhu. "Introduction to Machine Learning". Class lecture CS540 handout. Nov. 26, 2013 snapshot via archive.org. URL Link: <http://pages.cs.wisc.edu/~jerryzhu/cs540/handouts/introML.pdf>. Accessed May 2019. (Year: 2013).*

(Continued)

*Primary Examiner* — Neveen Abel Jalil
*Assistant Examiner* — Irene Baker
(74) *Attorney, Agent, or Firm* — Harrington & Smith

(57) ABSTRACT

A program is executed that includes multiple script functions. For a selected script function, the following are performed during program execution. It is determined whether the selected script function should or should not be executed based on a utility corresponding to the selected script function. The utility was determined prior to determining whether the selected script function should be executed. The selected script function is executed in response to a determination the selected script function should be executed. Execution of the selected script function is skipped in response to a determination the selected script function should not be executed. These techniques may be applied in real-time to crawl a program such as a webpage or may be applied using offline learning followed by a real-time crawling of the program. Apparatus, methods, and program products are disclosed.

14 Claims, 4 Drawing Sheets

(56) References Cited

U.S. PATENT DOCUMENTS

| | | | |
|---|---|---|---|
| 8,429,604 B1 | 4/2013 | Blas | |
| 8,468,156 B2 | 6/2013 | Halevy et al. | |
| 8,527,860 B1* | 9/2013 | Colton | G06F 16/972 |
| | | | 715/205 |
| 8,533,134 B1* | 9/2013 | Zhao | G06F 16/35 |
| | | | 706/12 |
| 9,158,604 B1* | 10/2015 | Christodorescu | G06F 9/54 |
| 2002/0032698 A1* | 3/2002 | Cox | G06F 17/3002 |
| | | | 715/210 |
| 2003/0061233 A1* | 3/2003 | Manasse | G06K 9/00885 |
| 2005/0203717 A1 | 9/2005 | Parimi | |
| 2006/0075302 A1* | 4/2006 | Ulrich | G06F 11/3688 |
| | | | 714/38.14 |
| 2007/0136682 A1* | 6/2007 | Stienhans | G06F 9/4443 |
| | | | 715/789 |
| 2008/0139191 A1* | 6/2008 | Melnyk | H04L 67/2823 |
| | | | 455/419 |
| 2010/0030780 A1* | 2/2010 | Eshghi | G06F 16/289 |
| | | | 707/758 |
| 2010/0077015 A1* | 3/2010 | Eshghi | G06F 17/10 |
| | | | 708/400 |
| 2011/0082855 A1* | 4/2011 | Al-Omari | G06F 16/2246 |
| | | | 707/715 |
| 2011/0314091 A1* | 12/2011 | Podjarny | G06F 17/2247 |
| | | | 709/203 |
| 2012/0011431 A1* | 1/2012 | Mao | G06F 16/972 |
| | | | 715/234 |
| 2012/0215727 A1* | 8/2012 | Malik | G06K 9/6259 |
| | | | 706/12 |
| 2012/0310914 A1 | 12/2012 | Khan | |
| 2012/0331372 A1 | 12/2012 | Scoda et al. | |
| 2013/0097706 A1* | 4/2013 | Titonis | G06F 21/56 |
| | | | 726/24 |
| 2013/0283246 A1* | 10/2013 | Krajec | G06F 11/3466 |
| | | | 717/130 |
| 2013/0290854 A1* | 10/2013 | Shukla | G06F 16/958 |
| | | | 715/736 |
| 2014/0156568 A1* | 6/2014 | Ganguly | G06Q 10/0637 |
| | | | 706/12 |
| 2014/0281918 A1* | 9/2014 | Wei | H04L 67/02 |
| | | | 715/234 |
| 2015/0186787 A1* | 7/2015 | Kumar | G06Q 10/107 |
| | | | 706/12 |
| 2016/0094572 A1* | 3/2016 | Tyagi | H04L 63/1425 |
| | | | 726/23 |

OTHER PUBLICATIONS

Krupa, T. et al.; "On-Demand Web Search Using Browser-Based Volunteer Computing"; 2012 Sixth International Conference on Complex, Intelligent, and Software intensive Systems (CISIS); pp. 184-190; IEEE Computer Society; 2012.

Anonymous; "System, Method and Apparatus for Effective Crawling of Web Applications Using Learning Techniques with Applications in Security Testing"; An IP.com Prior Art Database Technical Disclosure; http://ip.com/IPCOM/000227370D; May 3, 2013.

Anonymous; "Crawling and Testing Dynamic Web Applications"; An IP.com Prior Art Database Technical Disclosure; http://ip.com/IPCOM/000209833D; Aug. 17, 2011.

Tripp, Omer, et al., Improving the Usability of Static Security Analysis, ACM Conference on Computer and Communications Security 2014; pp. 762-774.

"Struts 2.3.15.3 GA", Apache Struts, struts.apache.org, Oct. 23, 2013, 1 pg.

"Application security risk management and compliance for the enterprise—Ensuring applications seucrity in mobile device environments", IBM Security AppScan Enterprise, Oct. 23, 2013, 2 pgs.

"Quickly identify, understand and fix critical web vulnerabilities—Five Steps to an Effective Application Security Program", IBM Security AppScan Standard, www-03.ibm.com/software/products/us/en/appscan-standard, Oct. 23, 2013, 2 pgs.

"What is jQuery?", jQuery Foundation (https://jquery.org), 2013, 3 pgs.

W3Schools.com. "HTML Styles", Jan. 13, 2015 snapshot via Archive.org. URL Link: <http://www.w3schools.com/html/html_styles.asp>. Accessed Dec. 2018 (Year: 2015).

W3Schools.com. "HTML Attributes", Jan. 13, 2015 snapshot via Archive.org. URL Link: <http://www.w3schools.com/html/html_attributes.asp>. Accessed Dec. 2018 (Year: 2015).

* cited by examiner

PREDICTING AND USING UTILITY OF SCRIPT EXECUTION IN FUNCTIONAL WEB CRAWLING AND OTHER CRAWLING

CROSS-REFERENCE TO RELATED APPLICATIONS

This application is a continuation of U.S. patent application Ser. No. 14/597,749, filed on Jan. 15, 2015, the disclosure of which is incorporated herein by reference in its entirety.

BACKGROUND

This invention relates generally to analysis of program code and, more specifically, relates to analysis of script content in a webpage or other program.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Acronyms used in the specification or drawings are presented below.

Functional testing of web applications is a central problem. Such functional testing includes testing web applications for security vulnerabilities, responsiveness, broken/incorrect workflows, and the like. A major challenge in functional testing is to obtain satisfactory coverage of the business logic of the subject web application. This is a goal of a functional crawler (e.g., running as a first phase of testing), which visits links and crawls through webpages in the same way as text crawlers, but has the objective of increasing functional rather than content coverage.

In recent years, rich internet applications (RIAs) are becoming increasingly widespread. Such applications make intensive usage of JavaScript and AJAX calls to enable smooth and dynamic user experience. For the functional crawler, this is a primary challenge. It is no longer sufficient to crawl the page in its initial form, because the JavaScript programs the page contains may interact with the server side and/or transform the webpage such that new possibilities of interaction arise.

This source of complication mandates new ways of deciding which JavaScript functions to execute as part of functional crawling. The naïve approach of simply running all functions in some arbitrary order, which is how existing tools like IBM Security App Scan Standard and Enterprise Edition address this difficulty, may be problematic because of the performance costs and potential side effects of JavaScript functions.

To appreciate this, note that HTML pages featured by industry-scale web sites can easily be over 10,000 lines long, and contain hundreds of JavaScript functions. This is especially true of auto-generated HTML pages created by client-side and/or server-side web frameworks like Struts and jQuery. Struts is a free, open-source, Model View Controller (MVC) framework for creating elegant, modern Java web applications. Java is a programming language and computing platform first released by Sun Microsystems in 1995. jQuery is a cross-platform JavaScript library designed to simplify the client-side scripting of HTML. As one example of auto-generated HTML pages, a table appearing in the HTML page may associate "Edit", "Delete", "Insert", and other operations with every row of the table that links to auto-generated JavaScript handlers.

For a commercial-grade website with many thousands of webpages, executing all the JavaScript functionality to improve coverage is often intractable. Hence, tools like AppScan often resort to user-provided bounds and configurations of different kinds that effectively constrain the web crawler in terms of the number of web pages the web crawler visits and the depth to which the web crawler processes and explores these webpages. Fixed, ad-hoc bounds lead to obvious problems and limitations in coverage, and are thus best avoided.

BRIEF SUMMARY

The following summary is merely intended to be exemplary. The summary is not intended to limit the scope of the claims.

In an exemplary embodiment, a method includes executing a program comprising a plurality of script functions. For a selected script function of the plurality of script functions, performing the following during program execution: determining whether the selected script function should or should not be executed based on a utility corresponding to the selected script function, wherein the utility was determined prior to determining whether the selected script function should be executed; executing the selected script function in response to a determination the selected script function should be executed; and skipping execution of the selected script function in response to a determination the selected script function should not be executed.

In another exemplary embodiment, a computer-readable storage medium comprises computer-readable code embodied thereon. Execution of the computer-readable code by at least one processor causes an apparatus to perform the method of the previous paragraph.

In a further exemplary embodiment, an apparatus includes one or more memories comprising computer-readable code, and one or more processors coupled to the one or more memories. The one or more processors are configured by execution of the computer-readable code to cause the apparatus to perform the following: executing a program comprising a plurality of script functions; for a selected script function of the plurality of script functions, performing the following during program execution: determining whether the selected script function should or should not be executed based on a utility corresponding to the selected script function, wherein the utility was determined prior to determining whether the selected script function should be executed; executing the selected script function in response to a determination the selected script function should be executed; and skipping execution of the selected script function in response to a determination the selected script function should not be executed.

In another exemplary embodiment, a method includes executing a program comprising a plurality of script functions. For script functions reached during program execution, the following are performed during program execution. A feature vector is determined based on a selected first script function. It is determined whether the feature vector is not or is a known feature vector stored in a database. In response to a determination that the feature vector is not a known feature vector stored in the database, the selected first script function is executed, a utility of the selected first script function is determined based at least on one or more function behaviors performed by the selected first script function during execution, and an entry comprising the determined feature vector and the utility is added to the database. In response to a determination that the feature vector is a known feature vector stored in the database, the following are performed. It is determined whether a selected second script function should or should not be executed based on a utility corresponding to the selected second script function, wherein the utility was determined prior to determining whether the selected second script function should be executed. The selected second script function is executed in response to a determination the selected second script function should be executed. The execution of the selected second script function is skipped in response to a determination the selected second script function should not be executed.

In another exemplary embodiment, a computer-readable storage medium comprises computer-readable code embodied thereon. Execution of the computer-readable code by at least one processor causes an apparatus to perform the method of the previous paragraph.

A further example is an apparatus comprising one or more memories comprising computer-readable code and one or more processors coupled to the one or more memories. The one or more processors are configured by execution of the computer-readable code to cause the apparatus to perform the following: executing a program comprising a plurality of script functions; for script functions reached during program execution, performing the following during program execution: determining a feature vector based on a selected first script function; determining whether the feature vector is not or is a known feature vector stored in a database; in response to a determination that the feature vector is not a known feature vector stored in the database, executing the selected first script function, determining a utility of the selected first script function based at least on one or more function behaviors performed by the selected first script function during execution, and adding an entry comprising the determined feature vector and the utility to the database; in response to a determination that the feature vector is a known feature vector stored in the database, performing the following: determining whether a selected second script function should or should not be executed based on a utility corresponding to the selected second script function, wherein the utility was determined prior to determining whether the selected second script function should be executed; executing the selected second script function in response to a determination the selected second script function should be executed; and skipping execution of the selected second script function in response to a determination the selected second script function should not be executed.

DETAILED DESCRIPTION

Figure 1:
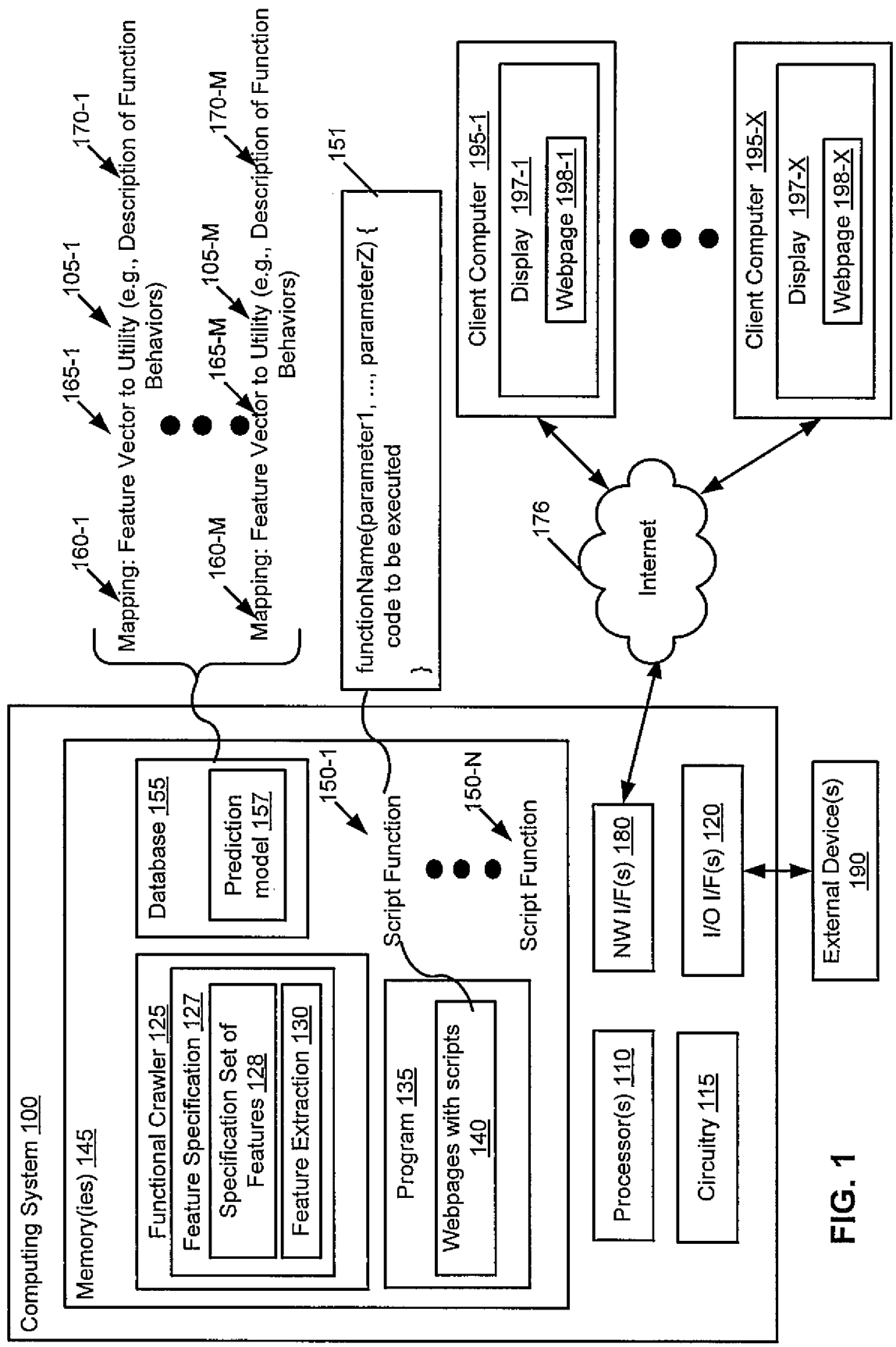
FIG. 1 is a block diagram of an example of a system suitable for performing the exemplary embodiments herein.

In exemplary embodiments herein, a principled alternative is proposed to the current systems, whereby script content, such as JavaScript content, is proposed to be explored. One exemplary approach herein is to apply learning, such that the role and relevance of a given script function is predicted in advance of its execution based on analysis of other script functions. These functions are considered either as part of offline learning or online via a real-time analysis, e.g., through the prefix of a crawling session. A goal is to prune scripts (that is, do not execute the scripts) meeting certain criteria, which results in a faster and more efficient execution of a web program.

The primary examples below are presented in the context of JavaScript and real-time analysis of a program code for a webpage. However, the examples are extendible to analysis of scripting languages other than JavaScript and to offline analysis. For instance, scripts for Flash may be used. ActionScript is the programming language used by Flash, which is a multimedia and software platform used for creating vector graphics, animation, games and rich Internet applications by Adobe Systems Incorporated. Other possible scripts include scripts for Silverlight, which is a development tool for creating engaging, interactive user experiences for Web and mobile applications, and active scripting, which is the technology used in Windows to implement component-based scripting support.

Before turning to a more complete description of the exemplary embodiments, we pause to describe additional material used to understand the embodiments and a rationale behind the exemplary proposed approaches.

With regard to JavaScript, JavaScript is a dynamic computer programming language. It is most commonly used as part of web browsers, whose implementations allow client-side scripts to interact with the user, control the browser, communicate asynchronously, and alter the document content that is displayed. It is also being used in server-side network programming, game development and the creation of desktop and mobile applications. JavaScript is classified as a prototype-based scripting language with dynamic typing and has first-class functions. This mix of features makes JavaScript a multi-paradigm language, supporting object-oriented, imperative, and functional programming styles.

Considering a rationale for using the instant exemplary approaches, as noted above, large HTML files—containing a high number of JavaScript functions—are becoming increasingly more common due to the rising popularity of web frameworks and auto-generated dynamic web UIs.

Because this JavaScript code originates from frameworks and automated UI synthesis algorithms, the resulting JavaScript functions often feature a high degree of regularity and repetition. Different functions from different webpages may have similar syntactic and structural characteristics, such as the following non-limiting examples:

their name and signature;
their abstract syntax tree (AST);
the functions they call as well as those invoking them; and
the DOM elements and attributes (or more generally, the DOM sub-tree) they access.

It is noted that the DOM is a cross-platform and language-independent convention for representing and interacting with objects in HTML, XHTML and XML documents. The nodes of every document are organized in a tree structure, called the DOM tree. Objects in the DOM tree may be addressed and manipulated by using methods on the objects. The public interface of a DOM is specified in its application programming interface (API). Note that these sources of similarity and regularity (such as syntactic and structural characteristics) across different functions permit inference, or prediction, from a JavaScript function that has been executed and tested dynamically for its behavior to a new JavaScript function, which has not yet been tried. This is one observation informing our algorithmic approach. This algorithmic approach is discussed in more detail below after an introduction to a computing system 100 is presented.

Turning to FIG. 1, a block diagram is shown of an example of a system suitable for performing the exemplary embodiments herein. A computing system 100 comprises one or more memories 145, one or more processors 110, circuitry 115, one or more network interfaces (N/W I/F(s)) 180, and one or more input/output interfaces (I/O IF(s)) 120. The computing system 100 may also be connected to external devices 190, which may allow an administrator to access the computing system 100 via a mouse, touchscreen, display screen, or other output or input (as external devices). The memories 145 may comprise non-volatile and/or volatile RAM (random access memory), cache memory, NAND-based flash memory, long term storage (e.g., hard drive), and/or read only memory.

The one or more memories 145 comprise a functional crawler 125, a database 155, and a program 135. The functional crawler 125 comprises a feature specification 127 having a specification set of features 128 and a feature extraction function 130. The program 135 includes webpages 140 with scripts, where the scripts perform some script functions 150-1 through 150-N. A script function has a generic form illustrated by example function 151, where a generic function with the name "functionName" has one or more parameters parameter1, . . . , parameterZ as input. The example function 151 has code to be executed. The example function 151 is a generic form fitting many different types of scripting languages, and one can see that such a function has clear boundaries.

The computing system 100 is connected to a network such as the Internet 176, although the Internet is merely exemplary. Client computers 195-1 through 195-X access the computing system 100 in order to display webpages 198-1 through 198-X on corresponding displays 197-1 through 197-X. Each webpage 198 includes some version of the webpages 140. For large commercial operations, the webpages 140 may number in the thousands or hundreds of thousands, and the client computers 195 display a small subset of the webpages 140 as corresponding webpages 198.

The functional crawler 125 may be implemented as computer-readable program code that is executable by the one or more processors 110 to cause the computing system 100 to perform one or more of the operations described herein. The processors 110 may be any processing units, such as digital signal processors and/or single-core or multi-core general purpose processors. In another example, the operations may also be performed, in part or completely, by circuitry 115 that implements logic to carry out the operations. The circuitry 115 may be implemented as part of the one or more processors 110 or may be separate from the one or more processors 110. The processors 110 may be any processing units, such as digital signal processors and/or single-core or multi-core general purpose processors. The circuitry 115 may be any electronic circuit such as an application specific integrated circuit or programmable logic.

The functional crawler 125 performs feature extraction of the script functions 150 using the feature extraction function 130. The feature extraction function 130 is guided by the specification set of features 128 and determines feature vectors 165-1 through 165-M for the script functions 150-1 through 150-N. Note that multiple script functions 150 may map to a single feature vector 160. Each feature vector 165, in an exemplary embodiment, may have a fixed number of elements, and each feature vector may have the same number of elements. Elements that do not apply to a particular script function 150 could be NULL elements or have values of zero for instance. Each element may correspond to any attribute of a script function, such as whether a keyword is used in the script function, whether certain constants or variables are used in the script, the number of arguments passed to the function, the types of arguments passed to the function, the type of return value, a number of additional functions called by the script function 150, and the like. Each element may contain any type of information, such as Boolean, integer, floating point, or strings. The specification set of features 128 could define features to consider such as, in addition to the features previously discussed, the number of incoming data values, number of loops performed, dynamic properties, and values flowing into or out of the script functions 150. Additional exemplary features are described below. The functional crawler 125 determines a mapping 160 between the feature vectors 165 and determined utility 105. The determined utility 105 may be characterized by the description of function behaviors 170. For instance, if the script function 150 performs reformatting of a table, the description of function behaviors 170 can be the reformatting of a table or changing the background of a table and the utility 105 therefore corresponds to the description of the function behaviors 170. The utility 105 may be determined to be low based on certain criteria (e.g., changing the background of a table has low utility).

Figure 2:
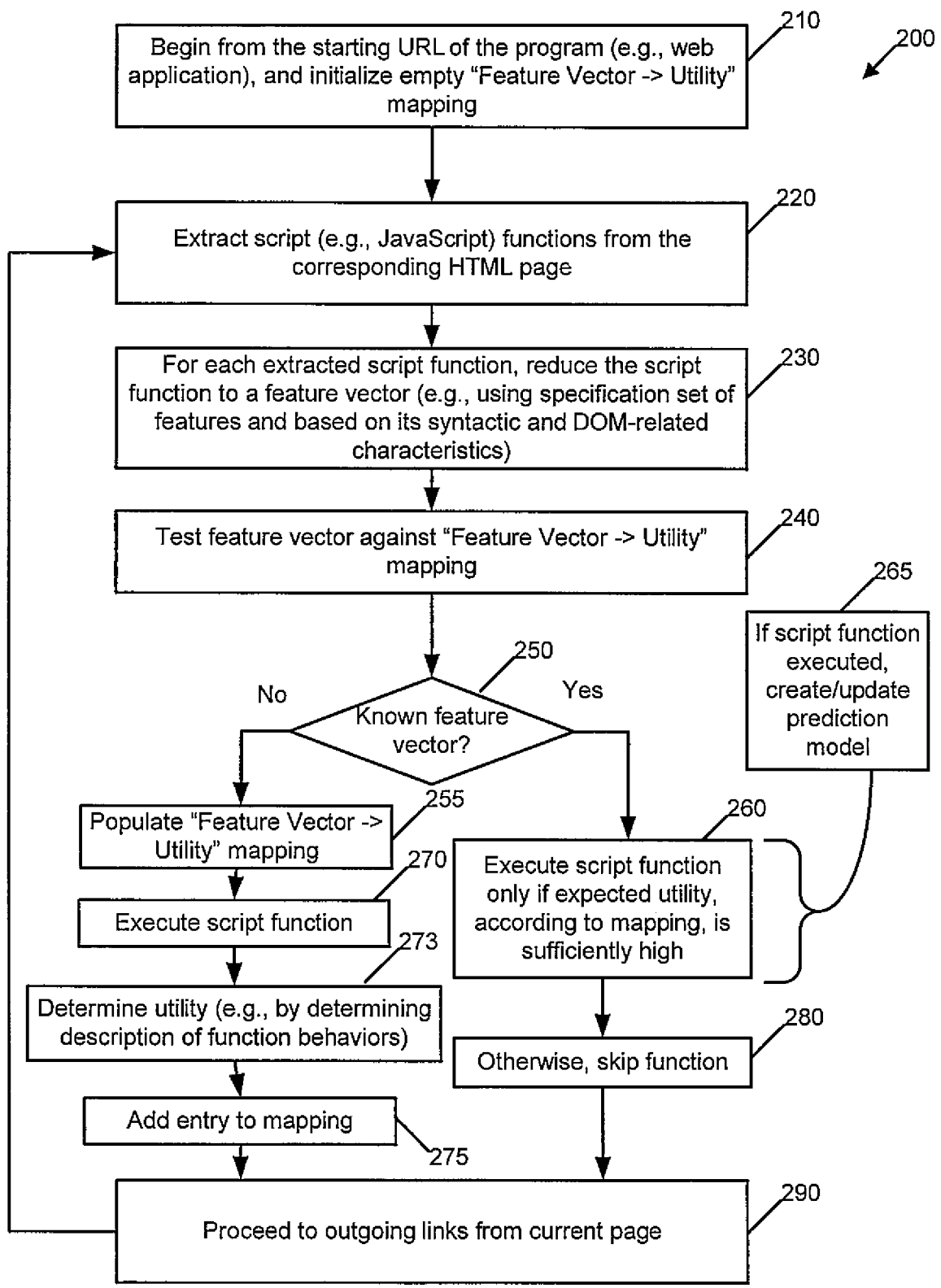
FIG. 2 is a logic flow diagram for predicting the utility of script execution in functional web crawling, and illustrates the operation of an exemplary method, a result of execution of computer program instructions embodied on a computer readable memory, and/or functions performed by logic implemented in hardware, in accordance with an exemplary embodiment.

More specifically, we propose the following method in an exemplary embodiment. Reference may be made to FIG. 2, which is a logic flow diagram 200 for predicting and using the utility of JavaScript execution in functional web crawling. FIG. 2 also illustrates the operation of an exemplary method, a result of execution of computer program instructions embodied on a computer readable memory, and/or functions performed by logic implemented in hardware, in accordance with an exemplary embodiment. The blocks in FIG. 2 may be considered to be interconnected means for performing the functions in the blocks. The blocks in FIG. 2 are performed by the computing system 100, e.g., under control at least in part of the functional crawler 125, which is executed as the program 135 is also executed.

FIG. 2 is assumed to be performed in real-time, although an offline technique is described below. For the real-time example, the database 155 is initially empty and the determination of feature vectors 165, the description of function vectors 170, and the corresponding mapping 160 is performed as the functional crawler 125 starts at a starting URL of a webpage application (e.g., program 135) and proceeds through the webpages of the program 135, e.g., as directed by the client computers 195 and as the program 135 is executed. That is, the client computers 195 request webpages from the computing system 100 and the functional crawler follows the requests through the program 135, building the database 155 as the program 135 is crawled.

Additionally, the prediction model 157 may be developed. The prediction model 157 is used to determine whether or not to skip a script function 150 and bases its predictions, e.g., on utility of the script function 150. The prediction model 157 may also be updated, e.g., in case execution of a script function 150 has different functional behaviors than predicted.

A feature specification 127 is assumed, which includes a feature extraction function 130 that translates a given script function 150 into a set (e.g., a vector 165) of feature values based on the specification set of features 128. Note that a script function may also be known as a script method. Examples of features have been given above. These features could further include one or more of the following, where JavaScript is used as an exemplary scripting language:

a. a regular description of the JavaScript function's name;
 b. the JavaScript function's signature;
 c. characteristics of the JavaScript function's AST (such as the loop structures the function contains, return points of the function, the shape of its control flow graph, and the like);
 d. the JavaScript function's call sites; and/or
 e. the global DOM elements that the function 150 accesses and/or manipulates.

In block 210, the flow 200 in FIG. 2 begins from a starting URL. Additionally, the functional crawler 125 initializes an initially empty learning database 155, which will house mapping 160 between feature vectors 165 and utility 105 (and possibly descriptions of function behaviors 170). In FIG. 2, this mapping is illustrated as "Feature Vector→Utility". The features are taken from the specification set of features 128.

For a new JavaScript function 150 encountered and extracted (block 220) from a corresponding HTML page during crawling, the feature crawler 125 reduces (block 230) the JavaScript function 150 into a feature vector 165 per the function specification 127 (e.g., and based on the syntactic and DOM-related characteristics of the script function 150). The reduction process from the code of a script function to a feature vector may be governed by "extraction rules". Each rule defines a property identifier (e.g., "loop count") as well as a static analysis algorithm that extracts the property value from the concrete script text (e.g., by modeling the script as an Abstract Syntax Tree (AST) and counting the number of loops the tree contains). Additional techniques for performing the reduction process are also described in, e.g., Omer Tripp, Salvatore Guarnieri, Marco Pistoia, Aleksandr Y. Aravkin, "ALETHEIA: Improving the Usability of Static Security Analysis", ACM Conference on Computer and Communications Security 2014: 762-774. Behavioral aspects in the descriptions of function behaviors 170 may include one or more of the following non-limiting examples:

a. a characterization of relevant DOM effects (whether or not the function modifies the DOM; if so, whether or not the function introduces new functions and/or changes the structure of outgoing links; and the like);
 b. a flag or confidence level indicating whether AJAX calls may be executed; and/or
 c. some measure of execution cost (e.g., running time).

Note that these behavioral aspects may also be used for the prediction model 157. For instance, the prediction model 157 could predict that one or more of (a) to (c) above would occur, based on previous execution of the script function 150. Then, in block 240, the feature vector 165 is tested versus the mapping 160 (illustrated as "Feature Vector→Utility" in block 240) in the database 155. The following are performed:

a. If the resulting feature vector 165 has a mapping under the database (block 250=Yes), then the function 150 is executed (block 260) if, and only if, the mapping 160 indicates the function 150 has a sufficiently high predetermined utility 105, e.g., where utility 105 is a function of one or more of the following non-limiting examples: execution of AJAX calls, updates to the link structure, even sufficiently (e.g., predicted) low cost of execution, or the like. In general, utility can be any domain of elements that comes equipped with a total order. In other words, execution of AJAX calls may be in an order and higher than the updates, the updates to the link structure are in the order and lower than execution of AJAX calls but higher than cost and execution and the cost of execution are in the order and lowest in the order (e.g., depending on the predicted cost of execution). In practice, it suffices to think of numeric values as being utility. Utility may be determined either directly by executing a script and computing the number of (new) links that execution of the script has exposed, or indirectly by estimating this number based on similarity between the script and previously executed scripts. Techniques for determining utility are also described in, e.g., Omer Tripp, Salvatore Guarnieri, Marco Pistoia, Aleksandr Y. Aravkin, "ALETHEIA: Improving the Usability of Static Security Analysis", ACM Conference on Computer and Communications Security 2014: 762-774.

Even if the script function 150 is likely irrelevant (that is, has low utility), based on a low cost of execution, then it may still be preferable to err on the conservative side and run the function 150. As a further example, the utility 105 could correspond to any execution of an AJAX call, or any update to the link structure, or a predetermined predicted cost of execution. Basically, the operation of block 260 is trying to skip script functions 150 of low importance, thereby not executing the functions, such that the program 135, e.g., will run faster and use fewer resources. For instance, a function 150 may update a background color of a table, and this function could be skipped with no loss of usefulness.

b. Otherwise, the function is skipped (block 280).
 c. If the feature vector is not known (block 250=No), the flow proceeds to block 255, where the "Feature Vector→Utility" mapping is populated. The flow then proceeds to block 270. One exemplary embodiment requires that an exact match occurs between two feature vectors for the feature vector to be determined to be known (and if there is no exact match, the feature vector is determined to not be known). Other exemplary embodiments can instead be based on similarity between two feature vectors, one for a current script function 150 and one in the database 155. The similarity is judged by a similarity (e.g., or distance) measure between the two feature vectors based on a similarity (e.g., or distance) threshold. The standard notion of similarity is (i) difference between numeric properties (e.g., number of statements or number of conditions in the code) and (ii) equality (i.e., true vs false) for non-numeric properties (like enum, enumerated, values). We can then apply clustering (i.e., check which instances cluster together according to the per-component comparisons). In block 270, the computing system 100 executes the script function 150. In block 273, the computing system 100 determines utility of the script function 150, e.g., based on the description of function behaviors 170, which are behaviors performed by the script function 150. The computing system 100 adds the corresponding entry, including a feature vector 165, utility 105, and possibly description of functions 170, to the mapping 160.

In block 290, the execution process proceeds to outgoing links from the current HTML page. Flow proceeds to block 220. Note that for simplicity, the flow 200 is shown without an end. However, the flow 200 may end at different times, such if the entire website has been crawled, some period of time has elapsed, or the like.

If the script function 150 is executed, in block 265, the prediction model 157 can be created or updated. The prediction model 157 for this selected script function 150 can be created, which means the prediction model 157 will determine predicted function behaviors for the selected script function 150. The prediction model 157 predicts, e.g., function behaviors such as those stored in description of function behaviors 170. Additionally, a cost of execution (e.g., one or more of time of execution, resources used) of the script function 150 may be determined based, e.g., on previous execution costs. If the script function 150 is resolved as having utility (block 260), but the predicted behavior is not compatible with the observed behavior for execution of the function, then the prediction model 157 persisted in the database is updated accordingly (e.g., lowering the confidence that execution of the function would lead to an AJAX call if that was the prediction, and the prediction was violated). Creating or updating the prediction model may involve two steps in an exemplary embodiment. The first step is to reflect all the known vector-to-utility data in the "Feature Vector→Utility" mapping. The second step is to initialize, based on the up-to-date data, a (standard) similarity algorithm (like KMeans or KStar). For an update, as new vector-utility pairs are established, the similarity algorithm is instantiated either incrementally or from scratch. Techniques for determining prediction models are also described in, e.g., Omer Tripp, Salvatore Guarnieri, Marco Pistoia, Aleksandr Y. Aravkin, "ALETHEIA: Improving the Usability of Static Security Analysis", ACM Conference on Computer and Communications Security 2014: 762-774.

We note that variants are possible. For example, an alternative to building the database of features-to-utility in real-time, during the crawling process as the program 135 is executed, is to apply offline learning. In this setting, the learning algorithm is fed a large number of training webpages collected (preferably at random) from a large and varied collection of websites. It then trains using the JavaScript (and/or other script language) functions in these webpages. Then there may not be a need, during online crawling, to apply any form of learning. Or, one could apply offline learning and combine this with real-time crawling of the program 135.

Figure 3A:
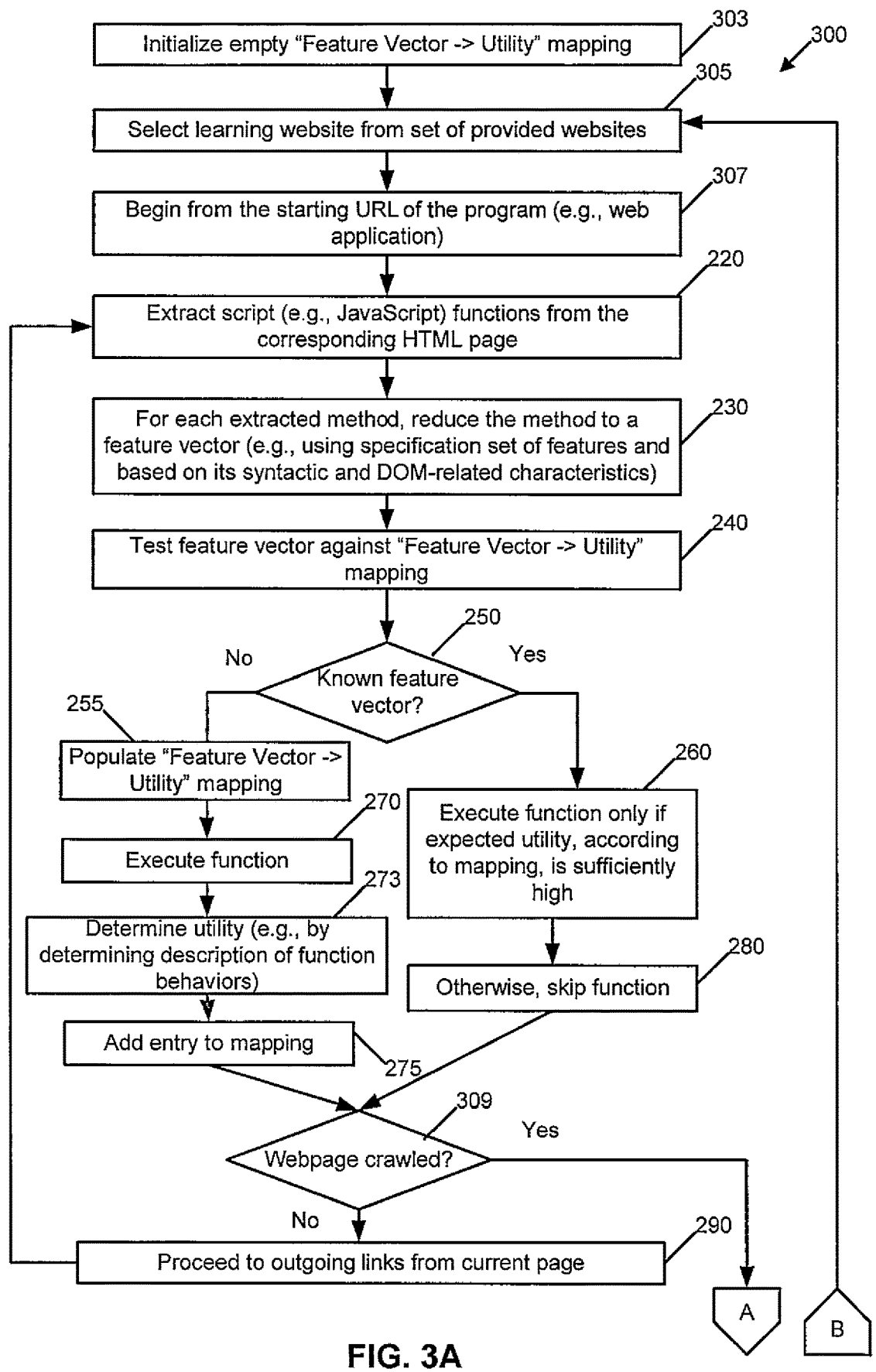
FIGS. 3A and 3B, collectively referred to as FIG. 3, are another logic flow diagram for predicting the utility of script execution in functional web crawling, and illustrate the operation of an exemplary method, a result of execution of computer program instructions embodied on a computer readable memory, and/or functions performed by logic implemented in hardware, in accordance with an exemplary embodiment.
Figure 3B:
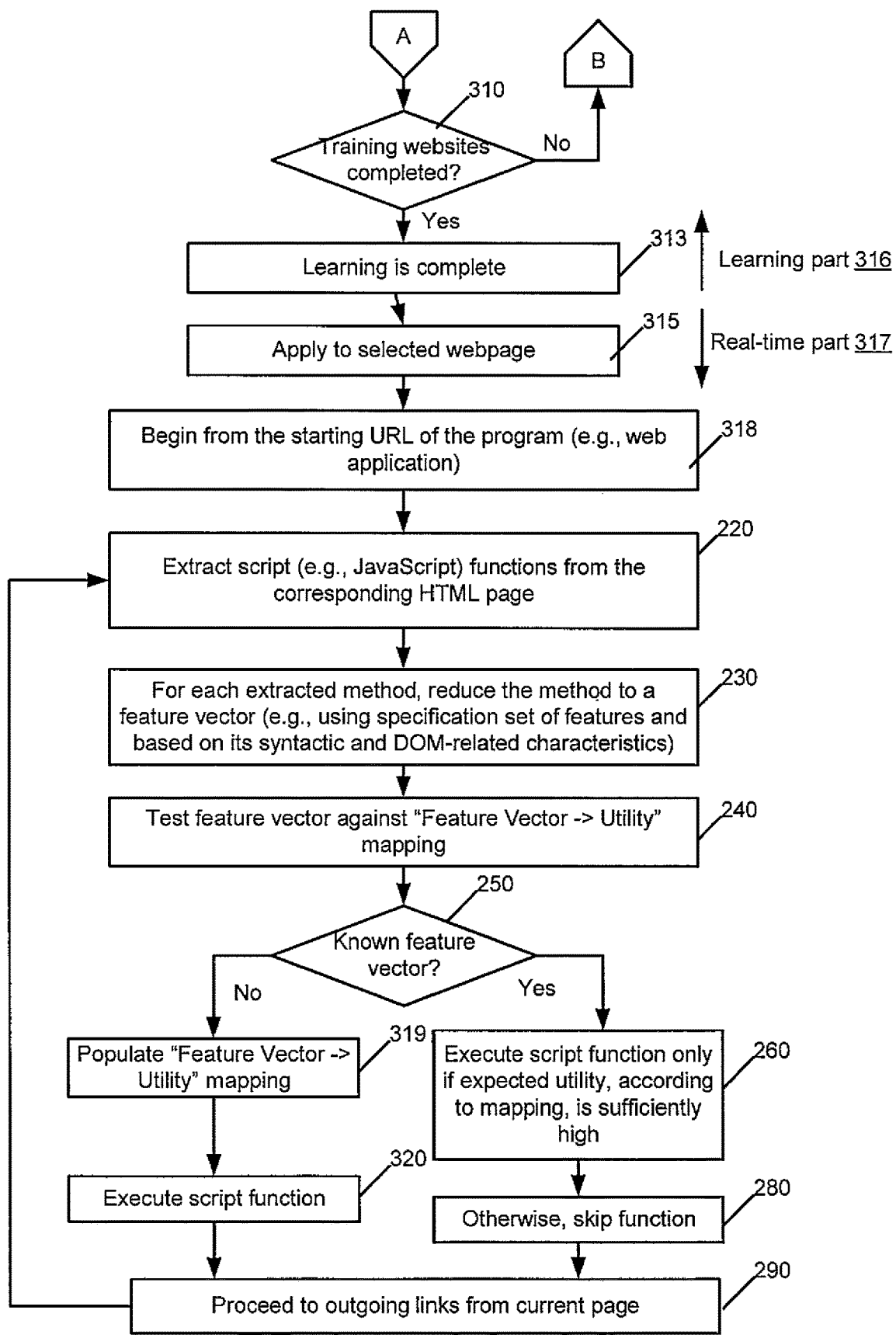

FIGS. 3A and 3B, collectively referred to as FIG. 3, are another logic flow diagram 300 for predicting the utility of script execution in functional web crawling. This example uses offline learning and then applies in real-time that learning to a crawled website. FIG. 3 illustrates the operation of an exemplary method, a result of execution of computer program instructions embodied on a computer readable memory, and/or functions performed by logic implemented in hardware, in accordance with an exemplary embodiment. The blocks in FIG. 3 may be considered to be interconnected means for performing the functions in the blocks.

In the example of FIG. 3, the computing system 100, e.g., under control of the functional crawler 125, performs the blocks in FIG. 3 and also performs offline learning that is subsequently applied to a website. Learning is performed from block 303 to block 313, which is called the learning part 316 of FIG. 3 and flow diagram 300. The results of the learning are then applied from block 315 and blocks subsequent to that block, which is called the real-time part 317 of FIG. 3 and flow diagram 300.

In block 303, the computing system 100 initializes an empty "Feature Vector→Utility" mapping 160. A set of learning websites are provided to the computing system 100, and in block 305, the computing system 100 selects a learning website from a set of provided websites. In block 307, the computing system 100 begins from the starting URL of the program 135 (e.g., web application). Blocks 220-290 have already been discussed in reference to FIG. 2. In block 309, the computing system 100 determines whether the website has been crawled. If not (block 309=No), the flow continues at block 290. If so (block 309=Yes), the flow continues at block 310. Note that other criteria, such as a time period, may be used to stop crawling of a website in block 309. Also note that a block similar to block 309 may be added to FIG. 2, and the block added to FIG. 2 can explicitly end the flow 200 in FIG. 2 once the webpage has been crawled.

In block 310, it is determined if all of the learning web sites have been completed. If not (block 310=No), the computing system 100 selects another learning website in block 305. If all of the learning websites have been completed (block 310=Yes), then learning is complete (block 313) and the newly learned mapping 160 can be applied to a selected webpage beginning at block 315. Block 315 begins the real-time part 317 of FIG. 3. In this example, if the feature vector is known (block 250=Yes) in the real-time part of FIG. 3, blocks 260 and 280 are performed. If the feature vector is not known (block 250=No) in the real-time part 317, then flow proceeds to block 319, where the "Feature Vector→Utility" mapping is populated with, e.g., the known feature vector and utility information. The flow then proceeds to block 320, where the script function is executed. Flow then proceeds to block 290. Note that if one wants to add additional real-time learning, block 320 could be replaced with blocks 270, 273, and 275 for instance.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include a propagating wave.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Acronyms used in the specification and/or drawings are defined as follows:

| | |
|---|---|
| AJAX | Asynchronous JavaScript + XML |
| API | Application Programming Interface |
| AST | Abstract Syntax Tree |
| DOM | Document Object Model |
| HTML | HyperText Markup Language |
| MVC | Model View Controller |
| UI | User Interface |
| URL | Uniform Resource Locator |
| XHTML | Extensible HyperText Markup Language |
| XML | Extensible Markup Language |

What is claimed is:

1. An apparatus, comprising:

one or more memories comprising computer-readable code;

one or more processors coupled to the one or more memories, the one or more processors are configured by execution of the computer-readable code to cause the apparatus to perform the following:

performing, by a computer system serving webpages through a network to one or more client computers, analysis of a web application program, the analysis comprising:

training the computer system to learn which script functions to execute, wherein training the computer system includes populating a database comprising of mappings between feature vectors and corresponding utilities, wherein each feature vector corresponds to a script function, wherein each feature vector is generated using a specification set of features, wherein each feature vector is based on syntactic and document object model (DOM) related characteristics of the script function, and wherein each utility corresponds to one or more descriptions of function behaviors observed during execution of the script function;

executing, by the computer system, the web application program comprising markup language for a webpage, the markup language comprising a plurality of script functions, the executing comprising performing the following by the computer system during program execution:

crawling the web application program while the web application program is being executed;

extracting and reducing the plurality of script functions encountered from the web application program code based on extraction rules, wherein the extraction and reduction process comprises of modeling the script function as an Abstract Syntax Tree (AST);

for each script function of the plurality of script functions, reducing the script function to a feature vector using the specification set of features and basing the feature vector on syntactic and DOM related characteristics of the script function;

predicting, for each selected script function of the plurality of script functions, whether the selected script function should or should not be executed by determining whether the feature vector corresponding to the selected script function is a known feature vector in the database;

in response to determining the feature vector is not a known feature vector in the database:
(a) executing the selected script function in order to determine the utility of the selected script function, wherein determining the utility of the selected script function is based on one or more descriptions of function behaviors observed during execution of the selected script function, and wherein the function behavior of the selected script function corresponds to at least one of: a characterization of relevant DOM effects, a flag or confidence level indicating whether Asynchronous JavaScript+XML (AJAX) calls may be executed, or a measure of execution cost; and
(b) adding an entry comprising a mapping of the feature vector and the utility to the database;

in response to determining the feature vector is a known feature vector in the database:
(a) selecting an entry in the database matching the feature vector;
(b) accessing the utility for the selected entry, wherein the utility was determined previously during training of the computer system;
(c) using a prediction model, predicting whether to execute the selected script function or skip executing the selected script function based on the utility being sufficiently high or not sufficiently high;
(d) in response to determining the utility is not sufficiently high, skipping execution of the selected script function; and
(e) in response to determining the utility is sufficiently high, (i) executing the selected script function; and (ii) updating the prediction model in response to a predicted behavior of the selected script function not being compatible with an observed behavior of the selected script function, wherein updating the prediction model comprises establishing a new mapping between the feature vector and the utility, the updating the prediction model further comprising instantiating the prediction model with a similarity algorithm incrementally or with a new similarity algorithm;

rendering the webpage in accordance with determining, based on the prediction model, whether the selected script function should be executed or should not be executed, wherein determining the selected script function should not be executed results in skipping execution of the selected script function; and serving the rendered webpage through the network to the one or more client computers.

2. The apparatus of claim 1, wherein determining whether the selected script function should or should not be executed based on the utility corresponding to the selected script function further comprises:
determining the selected script function should be executed when the utility of the selected script function is not sufficiently high and a predicted cost of execution being beneath a threshold.

3. The apparatus of claim 1, wherein the selected script function is a first selected script function and wherein the one or more processors are further configured by execution of the computer-readable code to cause the apparatus to perform, prior to determining whether the first selected script function should or should not be executed, the following:
determining a feature vector for a second selected script function;
determining whether the feature vector is a known feature vector stored in a database;
in response to a determination that the feature vector is not a known feature vector stored in the database, executing the second selected script function, determining the utility of the second selected script function based at least on one or more descriptions of function behaviors observed during execution of the second selected script function, and adding an entry comprising a mapping of the feature vector and the utility to the database.

4. The apparatus of claim 3, wherein the first and second selected script functions are different script functions with the same corresponding feature vectors.

5. The apparatus of claim 3, wherein the first and second selected script functions are different script functions with corresponding feature vectors that are similar based on a similarity measure.

6. The apparatus of claim 3, wherein the one or more processors are further configured by execution of the computer-readable code to cause the apparatus to perform the following:
as the program is executed, performing the determining a feature vector based on a second selected script function, determining whether the feature vector is a known feature vector stored in a database, and in response to a determination that the feature vector is not a known feature vector stored in the database: executing the second selected script function, determining the utility of the second selected script function based on one or more descriptions of function behaviors observed during execution of the second selected script function, and adding an entry comprising a mapping between the feature vector and the utility to the database.

7. The apparatus of claim 3, wherein the following are performed prior to the program being executed and performed using a plurality of different programs that do not include the program being executed:
performing the determining a feature vector based on a second selected script function, determining whether the feature vector is a known feature vector stored in a database, and in response to a determination that the feature vector is not a known feature vector stored in the database: executing the second selected script function, determining the utility of the second selected script function based on function behaviors observed during execution of the second selected script function, and adding an entry comprising a mapping between the feature vector and the utility to the database.

8. A computer-readable storage medium comprising computer-readable code embodied thereon, wherein execution of the computer-readable code by at least one processor causes an apparatus to perform:

performing, by a computer system serving webpages through a network to one or more client computers, analysis of a web application program, the analysis comprising:

training the computer system to learn which script functions to execute, wherein training the computer system includes populating a database comprising of mappings between feature vectors and corresponding utilities, wherein each feature vector corresponds to a script function, wherein each feature vector is generated using a specification set of features, wherein each feature vector is based on syntactic and document object model (DOM) related characteristics of the script function, and wherein each utility corresponds to one or more descriptions of function behaviors observed during execution of the script function;

executing, by the computer system, the web application program comprising markup language for a webpage, the markup language comprising a plurality of script functions, the executing comprising performing the following by the computer system during program execution:

crawling the web application program while the web application program is being executed;

extracting and reducing the plurality of script functions encountered from the web application program code based on extraction rules, wherein the extraction and reduction process comprises of modeling the script function as an Abstract Syntax Tree (AST);

for each script function of the plurality of script functions, reducing the script function to a feature vector using the specification set of features and basing the feature vector on syntactic and DOM related characteristics of the script function;

predicting, for each selected script function of the plurality of script functions, whether the selected script function should or should not be executed by determining whether the feature vector corresponding to the selected script function is a known feature vector in the database;

in response to determining the feature vector is not a known feature vector in the database:

(a) executing the selected script function in order to determine the utility of the selected script function, wherein determining the utility of the selected script function is based on one or more descriptions of function behaviors observed during execution of the selected script function, and wherein the function behavior of the selected script function corresponds to at least one of: a characterization of relevant DOM effects, a flag or confidence level indicating whether Asynchronous JavaScript+XML (AJAX) calls may be executed, or a measure of execution cost; and (b) adding an entry comprising a mapping of the feature vector and the utility to the database;

in response to determining the feature vector is a known feature vector in the database:

(a) selecting an entry in the database matching the feature vector;

(b) accessing the utility for the selected entry, wherein the utility was determined previously during training of the computer system;

(c) using a prediction model, predicting whether to execute the selected script function or skip executing the selected script function based on the utility being sufficiently high or not sufficiently high;

(d) in response to determining the utility is not sufficiently high, skipping execution of the selected script function; and (e) in response to determining the utility is sufficiently high, (i) executing the selected script function; and (ii) updating the prediction model in response to a predicted behavior of the selected script function not being compatible with an observed behavior of the selected script function, wherein updating the prediction model comprises establishing a new mapping between the feature vector and the utility, the updating the prediction model further comprising instantiating the prediction model with a similarity algorithm incrementally or with a new similarity algorithm;

rendering the webpage in accordance with determining, based on the prediction model, whether the selected script function should be executed or should not be executed, wherein determining the selected script function should not be executed results in skipping execution of the selected script function; and serving the rendered webpage through the network to the one or more client computers.

9. The computer-readable storage medium of claim 8, wherein the selected script function is a first selected script function and wherein the one or more processors are further configured by execution of the computer-readable code to cause the apparatus to perform, prior to determining whether the first selected script function should or should not be executed, the following:

determining a feature vector based on a second selected script function;

determining whether the feature vector is a known feature vector stored in a database;

in response to a determination that the feature vector is not a known feature vector stored in the database, executing the second selected script function, determining the utility of the second selected script function based at least on one or more descriptions of function behaviors observed during execution of the second selected script function, and adding an entry comprising a mapping of the feature vector and the utility to the database.

10. The apparatus of claim 1, wherein determining whether the feature vector is not or is a known feature vector stored in a database further comprises determining whether the feature vector is an exact match of a feature vector stored in the database, determining the feature vector is not a known feature vector in response to the feature vector not being an exact match of a feature vector stored in the database, and determining the feature vector is a known feature vector in response to the feature vector being an exact match of a feature vector stored in the database.

11. The apparatus of claim 1, wherein determining whether the feature vector is not or is a known feature vector stored in a database further comprises determining whether the feature vector is similar to a feature vector stored in the database by using a similarity measure between the feature vectors, determining the feature vector is not a known feature vector in response to the feature vectors not being similar based on a similarity threshold, and determining the feature vector is a known feature vector in response to the feature vectors being similar based on the similarity threshold.

12. The apparatus of claim 1, wherein the one or more processors are further configured by execution of the computer-readable code to cause the apparatus to perform the following:
training the computer system to learn which script functions to execute further comprises mapping between a function behavior and a utility wherein the function behavior is execution of an AJAX function.

13. The apparatus of claim 1, wherein the training the computer system to learn which script functions to execute further comprises:
selecting a website from a set of provided websites;
extracting and reducing a plurality of script functions encountered from a webpage of the website based on extraction rules, wherein the extraction and reduction process comprises of modeling the script function as an AST;
for each selected script function of the plurality of script functions, reducing the selected script function into a feature vector using a specification set of features including at least one of: a regular description of a name of the selected script function, a signature of the selected script function, characteristics of the AST of the selected script function, or global DOM elements the selected script function accesses or manipulates; and basing the feature vector on syntactic and DOM related characteristics of the script function;
in response to determining the feature vector is not a known feature vector in a database:
  (a) executing the selected script function in order to determine a utility of the function, wherein determining the utility of the selected script function is based on one or more descriptions of function behaviors observed during execution of the selected script function, and wherein a function behavior of the selected script function corresponds to at least one of: a characterization of relevant DOM effects, a flag or confidence level indicating whether AJAX calls may be executed, or a measure of execution cost; and
  (b) adding an entry comprising a mapping of the feature vector and the utility to the database;
in response to determining the feature vector is a known feature vector in the database:
  (a) selecting an entry in the database matching the feature vector;
  (b) accessing the utility for the selected entry, wherein the utility was determined previously during training of the computer system;
  (c) in response to determining the utility is not sufficiently high, skipping execution of the selected script function; and
  (d) in response to determining the utility is sufficiently high, executing the selected script function;
continuing to execute the program until the one or more webpages have been crawled;
continuing to select other websites from the set of provided websites and updating the database until all of the websites in the set of provided websites have been selected and their corresponding one or more webpages have been crawled.

14. The computer-readable storage medium of claim 8, wherein the training a computer system to learn which script functions to execute further comprises:
selecting a website from a set of provided websites;
extracting and reducing a plurality of script functions encountered from a webpage of the website based on extraction rules, wherein the extraction and reduction process comprises of modeling the script function as an AST;
for each selected script function of the plurality of script functions, reducing the selected script function into a feature vector using a specification set of features including at least one of: a regular description of a name of the selected script function, a signature of the selected script function, characteristics of the AST of the selected script function, or global DOM elements the selected script function accesses or manipulates; and basing the feature vector on syntactic and DOM related characteristics of the script function;
in response to determining the feature vector is not a known feature vector in a database:
  (a) executing the selected script function in order to determine a utility of the function, wherein determining the utility of the selected script function is based on one or more descriptions of function behaviors observed during execution of the selected script function, and wherein a function behavior of the selected script function corresponds to at least one of: a characterization of relevant DOM effects, a flag or confidence level indicating whether AJAX calls may be executed, or a measure of execution cost; and
  (b) adding an entry comprising a mapping of the feature vector and the utility to the database;
in response to determining the feature vector is a known feature vector in the database:
  (a) selecting an entry in the database matching the feature vector;
  (b) accessing the utility for the selected entry, wherein the utility was determined previously during training of the computer system;
  (c) in response to determining the utility is not sufficiently high, skipping execution of the selected script function; and
  (d) in response to determining the utility is sufficiently high, executing the selected script function;
continuing to execute the program until the one or more webpages have been crawled;
continuing to select other websites from the set of provided websites and updating the database until all of the websites in the set of provided websites have been selected and their corresponding one or more webpages have been crawled.

* * * * *